US008215218B2

(12) United States Patent
Al-Heraibi

(10) Patent No.: US 8,215,218 B2
(45) Date of Patent: Jul. 10, 2012

(54) SANDWICH HOLDER AND KNIFE GUIDE

(76) Inventor: Abdulrahman Saleh Al-Heraibi, Alrabea (KW)

( * ) Notice: Subject to any disclaimer, the term of this patent is extended or adjusted under 35 U.S.C. 154(b) by 221 days.

(21) Appl. No.: 12/794,953

(22) Filed: Jun. 7, 2010

(65) Prior Publication Data

US 2011/0296967 A1 Dec. 8, 2011

(51) Int. Cl.
*A47J 43/00* (2006.01)
*B26D 7/01* (2006.01)

(52) U.S. Cl. ................ 83/454; 83/932; 83/607; 83/651; 83/675; 30/114; 30/253; 30/289; 30/296.1; 99/537

(58) Field of Classification Search .................... 30/314, 30/315, 318, 114, 244, 246, 253, 286, 289, 30/282, 280, 296.1, 123; 83/13, 454, 745, 83/746, 761, 762, 946, 932, 452, 460, 651, 83/662, 607–609, 675; 99/537
See application file for complete search history.

(56) References Cited

U.S. PATENT DOCUMENTS 1,953,137 A * 4/1934 Streckfuss ...................... 83/762
2,652,087 A 9/1953 Turpin
2,925,110 A 2/1960 Bayers
3,018,806 A * 1/1962 Moore ............................ 83/451
3,319,682 A 5/1967 Hall
3,452,795 A * 7/1969 Davies ............................ 83/762
3,639,981 A * 2/1972 Nowensky ...................... 83/651
3,780,436 A * 12/1973 Pellman .......................... 30/123
4,341,376 A 7/1982 Germinario
4,589,206 A * 5/1986 Marcoux ......................... 30/114
4,811,642 A * 3/1989 Sorbie ............................. 83/574
5,115,704 A * 5/1992 Hyman ........................ 83/467.1
5,461,971 A * 10/1995 Brooks ........................... 99/645
5,899,133 A * 5/1999 Halladay et al. ................ 83/608
6,224,928 B1 5/2001 Jacobbi
6,564,685 B1 * 5/2003 Beaton ............................ 83/609
2002/0194738 A1 * 12/2002 Francisco ....................... 30/291
2005/0274244 A1 * 12/2005 Geissler ............................ 83/13

* cited by examiner

*Primary Examiner* — Phong Nguyen
(74) *Attorney, Agent, or Firm* — Lowe Hauptman Ham & Berner LLP

(57) ABSTRACT

A sandwich holder and knife guide for cutting a sandwich in half while maintaining the ingredients in place includes a base, a pair of upwardly extending parallel walls with an aligned slit in each of the walls for guiding a knife through a sandwich, a transparent dome with a slit aligned with the slits in the walls, a knife, a support frame, a pair of stainless steel tapes disposed on opposite sides of the slits and each of the tapes extending across the support frame in a parallel relationship with the slits and one end of each of the tapes is coiled upon a retractable coil for maintaining the tapes under tension so that the tapes when extended and placed on top of the sandwich retain the sandwich and its fillings in place when the sandwich is cut in half.

5 Claims, 5 Drawing Sheets

SANDWICH HOLDER AND KNIFE GUIDE

FIELD OF THE INVENTION

This invention relates to a transparent sandwich holder and knife guide for cutting sandwiches in half or in smaller portions while maintaining the ingredients or filling inside of the sandwich in place before, during and after cutting the sandwich and at the same time preventing an individual from cutting their hand or fingers.

BACKGROUND FOR THE INVENTION

Devices for assembling sandwiches and cutting sandwiches are well known and have been in use for many years. For example, a U.S. Pat. No. 4,341,376 of Germinario discloses a sandwich assembly jig. As disclosed therein, a jig with multiple units each for assembling and slicing two sandwiches at a time has a base with four upstanding walls for each unit surrounding a generally rectangular volume shaped to receive two pairs of bread slices and a filling between each pair. At two diagonal corners of the walls there are narrow, aligned slits receiving and guiding a knife for slicing the two sandwiches into two symmetrical pairs of stacked halves. The other diagonal corners are relatively widely spaced to form finger accesses for gripping the sliced sandwiches. A hollow in the base at the other corners further facilitates finger access. A removable cutting slab lying between the walls permits lifting both sandwiches at once.

A more recent U.S. patent of Donoghu, U.S. Pat. No. 5,832,800 discloses a club sandwich cutter. As disclosed therein, a cutter for manually cutting club sandwiches into four wedge or triangular sections. The cutter has a flat base and a cutting blade assembly mounted to the base. The cutting blade assembly comprises four blades arranged in cruciform pattern, a handle, and a shaft connecting the blades to the handle. A cover guard preventing direct contact with the blades from above is slideably mounted on the shaft, and urged into proximity with the blades by a spring. The cover guard has holes enabling decorative toothpicks to be inserted into the center of each section of a cut sandwich. A guide constrains the cutting blade assembly to move only vertically and reciprocatably relative to the base, and prevents rotation about the longitudinal axis of the shaft. A resilient member holds the cutting blade assembly in an elevated "ready" position above the base. Stops are selectively mounted on the base to enable centering sandwiches made from different standard bread loaf dimensions on the base.

Finally a method for making sandwiches is disclosed in a U.S. patent of Jacobbi, U.S. Pat. No. 6,224,928. As disclosed, an article for making sandwiches has a floor and a pair of side walls and is open along the top and at least one end is sized to have a floor width which is equal substantially to the width of a sandwich to be made therewith and a side wall height which is at least equal to about the height of the sandwich to be made therein. A bread portion of a sandwich is placed on the floor and between the sidewalls, and additional sandwich portions are stacked on the bread portion and between the side walls whereby the side walls constrain the sandwich over its height from falling apart as it is being stacked so that sandwiches may be made faster and with greater efficiency.

Notwithstanding the above, it is presently believed that there is a need and a potential commercial market for an improved sandwich holder and knife guide in accordance with the present invention. There should be a need and a potential market for an improved sandwich holder and knife guide because they facilitate cutting sandwiches in half or in smaller portions while maintaining the ingredients in place and at the same time protecting the hands and fingers from being inadvertently cut. Further, the device in accordance with the present invention facilitates cleaning and/or sharpening a knife and cleaning the entire device without a danger of cutting one's hands. Further, the sandwich holder and knife guide in accordance with the present invention includes a transparent plastic dome that is defined by a supporting frame for covering a sandwich during a cutting process that protects the hands and fingers of a user. It is further believed that the sandwich holder and knife guide can be safely used by children with proper supervision and are useful in homes, restaurants, schools and cafeterias and can be used to cut burgers of different sizes and even used to cut wrapped burgers that have been wrapped in paper or plastic wrap.

BRIEF SUMMARY OF THE INVENTION

In essence, a sandwich holder and knife guide for cutting a sandwich in half while maintaining the ingredients in place may include a removable base or flat surface and a pair of upwardly extending parallel walls with an aligned slit in each of the walls for guiding a knife through a sandwich. A transparent dome that is surrounded by a support frame is also provided. The transparent dome can be open on opposite sides thereof and with a slit aligned with the slits in the upwardly extending walls. A knife having a blade, a forward portion and a handle, and a pivot point fixed to the support frame and means for pivotly attaching a forward portion of the knife blade to the pivot point for moving the knife through the slit. In addition, a pair of stainless steel tapes are provided with the tapes disposed on opposite sides of the slits and each of the tapes extending across the support frame in a parallel relationship with the slits. One end of each of the tapes is coiled upon a retractable coil for maintaining the tapes under tension so that the tapes when extended and placed on top of a sandwich retain the fillings in place when a sandwich is cut in half. The tapes are preferably spaced apart by a distance of about one and one half inches or about four centimeters. In addition, the upwardly extending walls and the transparent dome are made of clear plastic.

In a preferred embodiment of the invention the sandwich holder and knife guide include a knife with a horizontally extending slot adjacent to and forming a part of a pivot point. The slot is between about one half and one inch in length so that the knife is rotatable about the forward portion of the slot between a vertical position and a horizontal position and yet in the horizontal position may be moved forward or back to completely cut through the bread or roll.

The invention will now be described in connection with the accompanying drawings wherein like reference numerals have been used to indicate like parts.

DESCRIPTION OF THE PREFERRED EMBODIMENTS OF THE INVENTION

A sandwich holder and knife guide for cutting a sandwich in half while maintaining the sandwich including a bun and/or bread as well as ingredients or filling in place while protecting an individual's hands and fingers from being cut in accordance with the present invention will now be described with reference to FIGS. 1 through 4.

Figure 1:
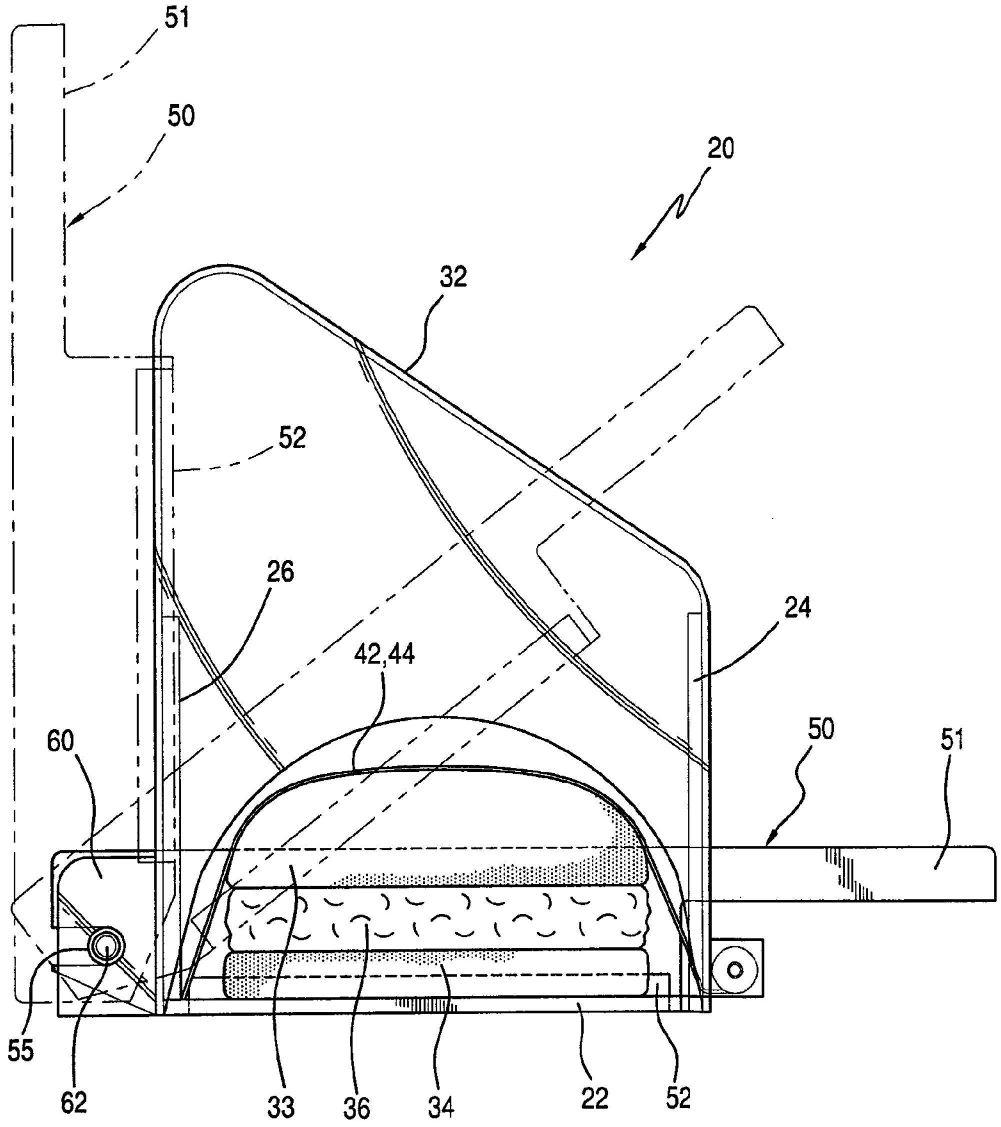
FIG. 1 is a front elevational view of a sandwich holder and knife guide in accordance with a first embodiment of the invention.

As shown in FIG. 1 a sandwich holder and a knife guide 20 includes a base 22 of a hard plastic material or a flat surface and a pair of upwardly extending walls 24 and 26 of a similar material. The upwardly extending walls each include an aligned slit 23 and 25 (see FIG. 2) respectively that are provided to guide a knife 50 through a sandwich. A typical sandwich includes an upper portion of a bun 33 and lower portion 34 as well as meat, cheese and/or additional fillings 36. In a preferred embodiment of the invention the upwardly extending walls 24 and 26 are both made of a transparent material and provide a relatively wide opening for an individual to reach in to position a sandwich or to take it out. In a further embodiment of the invention, shown in FIG. 4, the transparent cover 32 does not include an opening in each side thereof in order to reach in for the sandwich. Instead, the transparent cover 32 is removed in order to take out the sandwich.

The sandwich holder and knife guide 20 also includes a transparent rigid plastic cover 32 with relatively large openings on opposite sides thereof that allows an individual to reach into the interior thereof to position or construct the sandwich having an upper portion 33 of a bun or piece of bread, a lower portion of 34 of the bun or bottom slice of bread with a burger 36 or the like, between the two pieces of a roll.

Figure 2A:
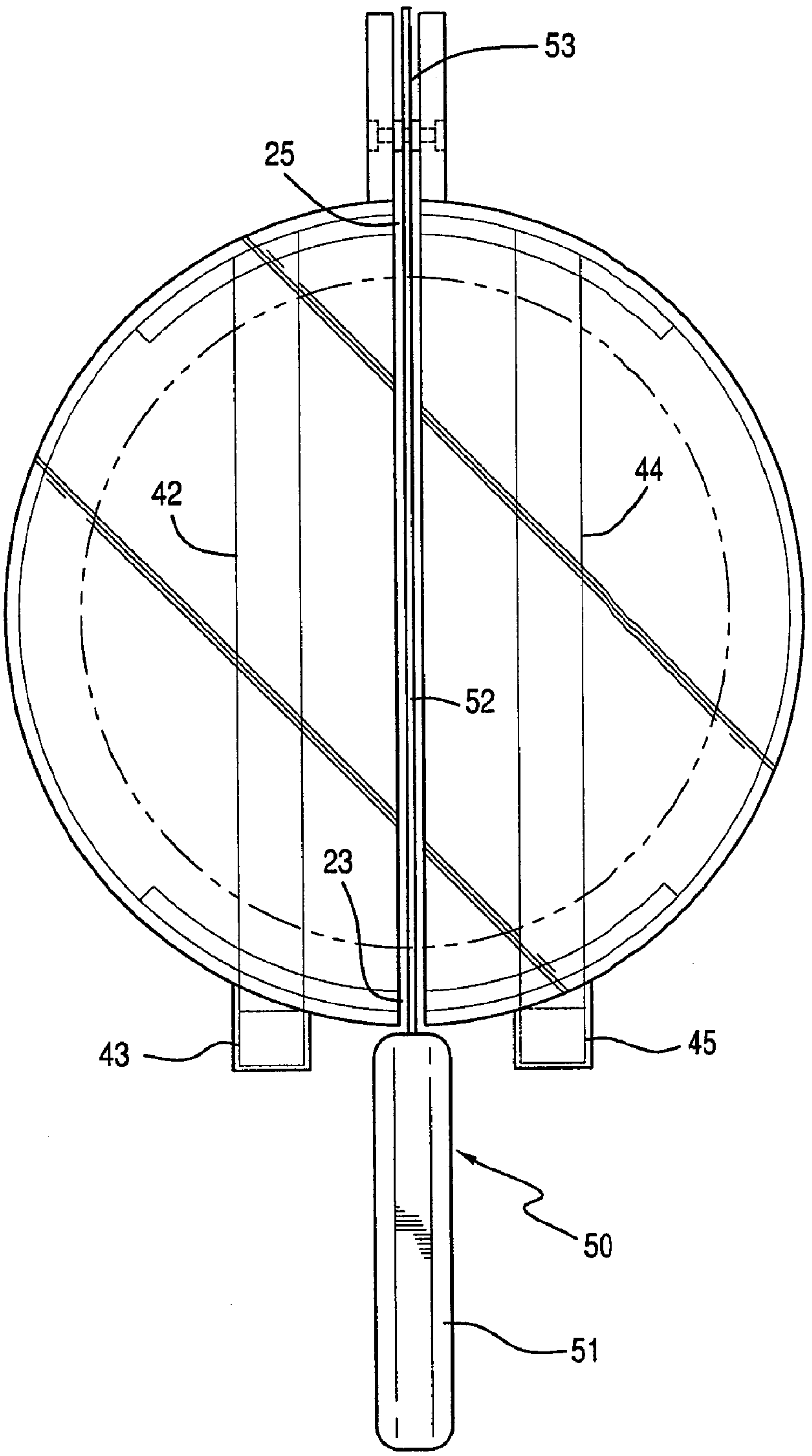
FIG. 2A is a top or plan view of the sandwich holder and knife guide shown in FIG. 1.
Figure 2B:
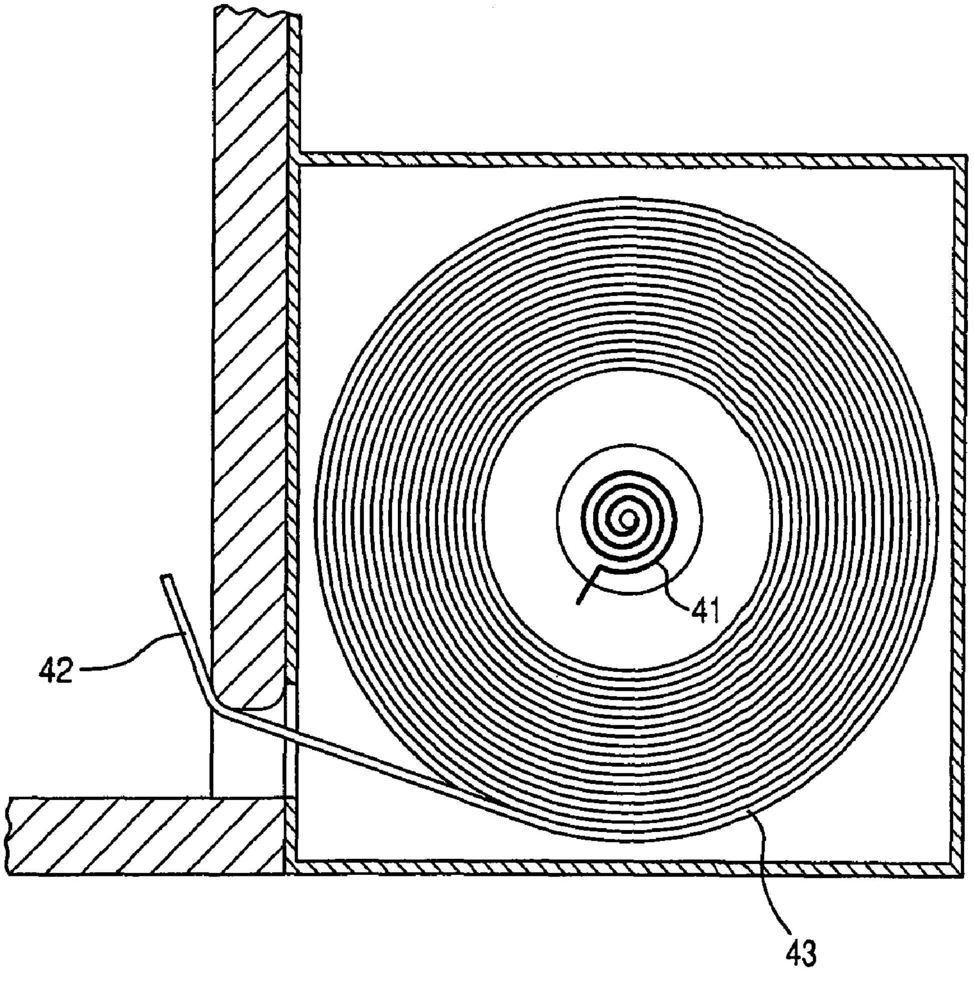
FIG. 2B is a sectional view of a retractable coil box.

As shown in FIG. 2A, the sandwich is held in place by a pair of stainless steel tapes 42 and 44 with the tapes on opposite sides of the aligned slits 23 and 25 in the upwardly extending walls 24 and 26.

As shown, the tapes 42 and 44 are attached to a coil 43 and 45 respectively that maintains each of the tapes under tension and are attached to the support frame at an opposite side thereof. A coil spring 41 maintains tension on the coil in a conventional manner. Thus, a sandwich is placed on the base between the upwardly extending walls 24 and 26 or placed on any flat surface and the transparent dome is placed on it and the tapes will be extended above the sandwich. The coils 43 and 45 then pull the tapes down onto the sandwich with one tape on each side of the slit to firmly hold the sandwich in place when a knife 50 cuts through the sandwich.

The knife 50 includes a blade 52 and a handle 51 at one end thereof and a forward portion 53 at opposite end from the handle 51. An upwardly extending element 60 is fixed to the support frame 80 and extends upwardly therefrom. The element 60 includes a pivot assembly 62. The forward portion 53 of the knife 50 includes a hole i.e. an opening 70 that slides over the pivot assembly 62 and is rotatable through an arc to cut through a sandwich. Nevertheless the knife 50 can be disjointed from the pivot assembly 62 for cleaning and or sharpening the knife 50.

The cutting process includes the step of placing a sandwich on the cutting surface under the projected path of the knife blade. The two halves of the sandwich are each placed under one of the retractable stainless steel tapes and after being covered with the transparent dome with one half of the sandwich on one side of the slit or knife guide and the other half under the other side of the slit or knife guide. The knife is then pulled down toward the user and down through an arc as it rotates about its pivot point. If desired the sandwich or transparent dome can then be turned by 90° so that another cut with the knife will cut the sandwich into quarters. After completion of the cutting, the knife is rotated back to a vertical position and the transparent dome removed. The sandwich is then removed from under the stainless steel tapes. Subsequently, the knife can be removed from the pivot for cleaning and sharpening and the entire holder is cleaned.

Figure 3:
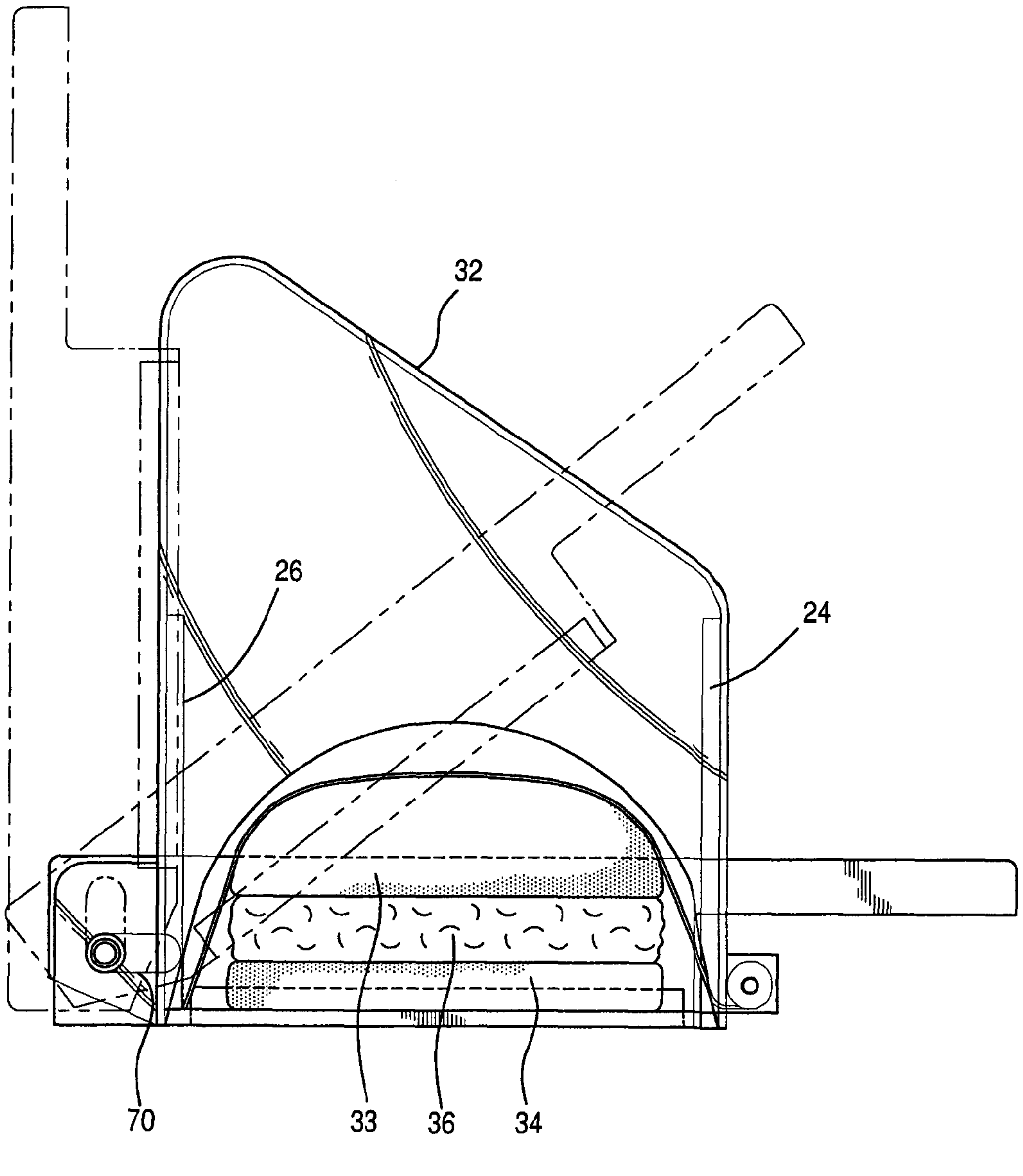
FIG. 3 is a front view of a sandwich holder and knife guide in accordance with a further embodiment of the invention.
Figure 4:
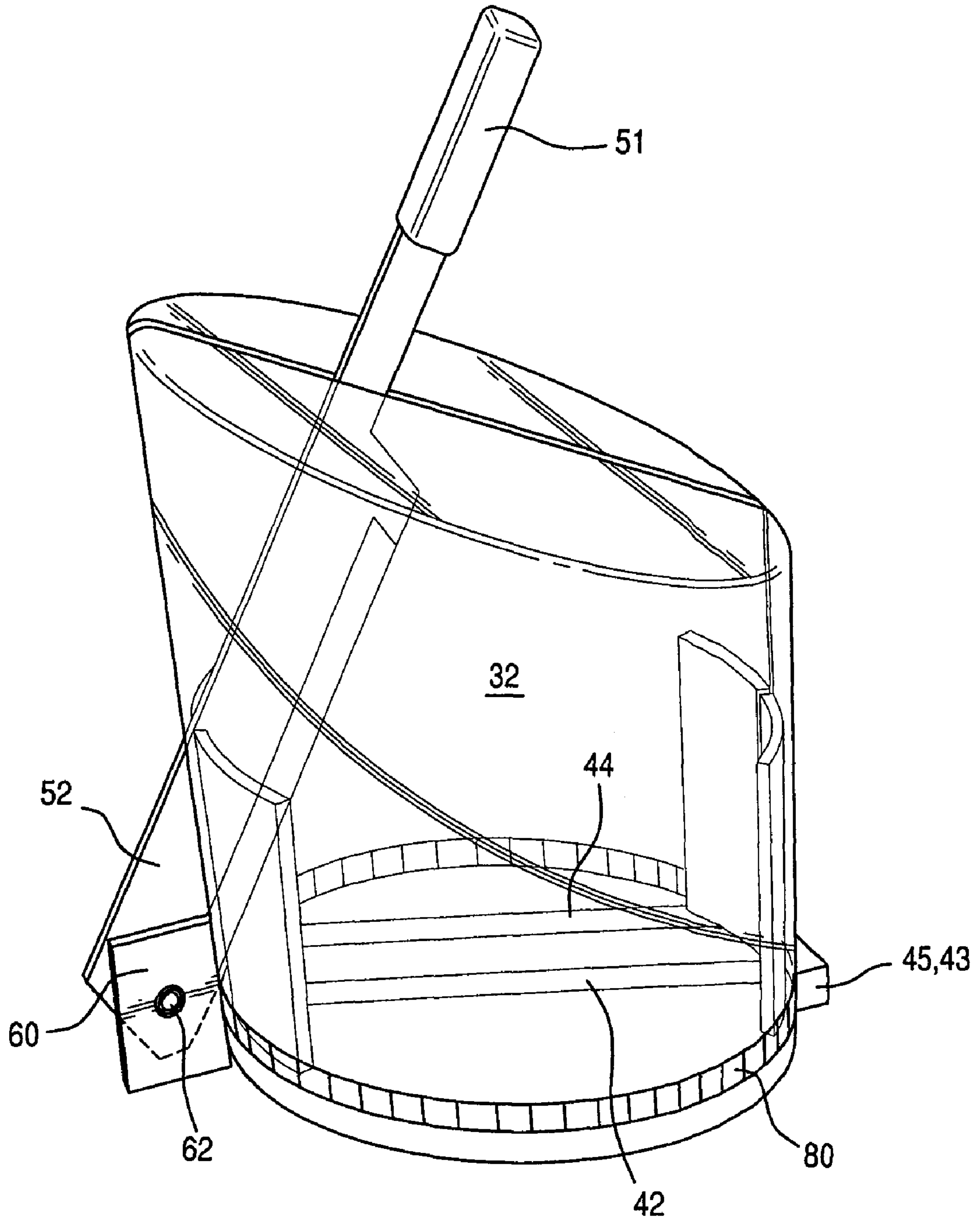
FIG. 4 is a perspective view of a sandwich holder and knife guide including a transparent cover that protects an individual's hands and fingers during a cutting operation.

A fourth embodiment of the invention is illustrated in FIG. 3 wherein a forward portion of the knife 50 includes a longitudinally extending slot 70 with a rounded end on a forward portion thereof. The rounded end engages the pivot assembly 62 as the knife 50 is used to cut through a sandwich. Then when the knife 50 reaches the bottom of the arc cut wherein the knife is in a generally horizontal position, the knife is pushed away from the pivot assembly to move along the opening or slot 70 to move linearly and completely cutting the sandwich in half.

An individual can then reach in to grasp the sandwich, remove the transparent dome and by gripping the sandwich remove it either from the base or any flat surface that has been used.

While the invention has been described in connection with its preferred embodiments it should be recognized that changes and modifications may be made therein without departing from the scope of the appended claims.

What is claimed is:

1. A sandwich holder and knife guide for cutting a sandwich in half while maintaining the sandwich including a filling in place without falling apart, said holder and guide comprising:

a pair of upstanding walls with an aligned slit in each of said walls for guiding a knife through a sandwich, a cover open on opposite sides, and a support frame with a slit aligned with said slits in said walls;

a knife having a blade, a forward portion and a handle, a pivot point fixed to said support frame and means for pivotally attaching said forward portion of said knife to said pivot point for moving said knife through said slit;

a pair of stainless steel tapes with said tapes disposed on opposite sides of said slits and each of said tapes extending across a space between said walls in a parallel relationship with said slits and one end of each of said tapes coiled upon a retractable coil for maintaining said tapes under tension so that when the cover is placed over the sandwich said tapes will extend and hold the filling in place when the sandwich is cut in half.

2. A sandwich holder and knife guide for cutting a sandwich in half while maintaining the ingredients in place according to claim 1 in which said tapes are spaced apart by a distance of about one and one half inches.

3. A sandwich holder and knife guide for cutting a sandwich in half while maintaining the ingredients in place in accordance with claim 2 in which said support frame, said pair of parallel walls and said cover is made of clear plastic and said forward portion of said knife is removable from said pivot point.

4. A sandwich holder and knife guide for cutting a sandwich in half while maintaining the ingredients in place in accordance with claim 3 in which said forward portion of said knife includes a horizontal slot attached to said pivot point and having a length of about one half to about one inch in length so that said knife is rotatable about said forward portion of said slot and moveable linearly when said knife is in the horizontal position with its edge on or near a flat surface that has been used under said knife guide for supporting a sandwich.

5. A sandwich holder and knife guide for cutting a sandwich in half while maintaining the ingredients or filling in place, said holder and knife guide consisting of a base, a pair of upstanding walls with an aligned slit in each of said walls for guiding a knife through a sandwich placed there between and a transparent dome with a slit aligned with said slits in said walls and wherein said upwardly extending walls and said transparent dome are made of rigid plastic;

a knife having a steel blade, a forward portion and a handle, a pivot point fixed to a support frame and means for pivotally attaching said forward portion of said knife to said pivot point for moving said knife through said slit but removable therefrom;

a pair of relatively flexible stainless steel tapes with said tapes disposed on opposite sides of said slits and each of said tapes extending across said support frame in a parallel relationship with said slits and one end of each of said tapes coiled upon a retractable coil for maintaining tension on said tapes in which said forward portion of said knife includes slot of about one half to about one inch in length so that said knife is rotatable about said forward portion of said slot and moveable transversely when said knife is in a horizontal position with its edge near or upon said base or any flat surface that has been used for supporting the sandwich to thereby cut completely through the sandwich.

* * * * *